United States Patent

Barr et al.

[11] Patent Number: 5,265,910
[45] Date of Patent: Nov. 30, 1993

[54] VEHICLE SEAT BELT SHOULDER STRAP ADJUSTING DEVICE

[75] Inventors: David A. Barr; Steve Burke; Michael L. Fowler, all of Arlington, Tex.

[73] Assignee: Buckle Buddy Corporation, Arlington, Tex.

[21] Appl. No.: 842,886

[22] Filed: Feb. 26, 1992

[51] Int. Cl.⁵ ............................................. B60R 22/30
[52] U.S. Cl. ................................ 280/808; 280/801 R; 297/483; 24/197
[58] Field of Search ................. 280/801, 808, 801 R; 24/197, 200; 297/483

[56] References Cited

U.S. PATENT DOCUMENTS

| Re. 32,448 | 6/1987 | Anderson | 280/808 |
|---|---|---|---|
| 4,014,080 | 3/1977 | Caradec | 24/602 |
| 4,315,637 | 2/1982 | Frantom | 280/801 R |
| 4,396,228 | 8/1983 | Go | 297/484 |
| 4,452,469 | 6/1984 | Rogers, Jr. | 280/801 R |
| 4,480,853 | 11/1984 | Ando et al. | 280/801 R |
| 4,522,426 | 6/1985 | Weman | 280/801 R |
| 4,549,770 | 10/1985 | Kurtti | 297/479 |
| 4,600,626 | 7/1986 | Ogata | 428/193 |
| 4,624,479 | 11/1986 | Grunewald | 280/801 R |
| 4,682,790 | 7/1987 | Katsuno et al. | 280/801 R |
| 4,706,992 | 11/1987 | Downing et al. | 280/801 R |
| 4,718,696 | 1/1988 | Koide et al. | 280/801 R |
| 4,738,413 | 4/1988 | Spinosa et al. | 244/151 R |
| 4,762,338 | 8/1988 | Hayden | 280/801 R |
| 4,790,597 | 12/1988 | Bauer et al. | 297/468 |
| 4,848,794 | 7/1989 | Mader et al. | 280/801 R |
| 4,871,190 | 10/1989 | Willey | 280/801 R |
| 4,871,192 | 10/1989 | Escaravage et al. | 280/801 R |
| 4,935,994 | 6/1990 | Boone et al. | 24/196 |

FOREIGN PATENT DOCUMENTS

| 3626443 | 2/1988 | Fed. Rep. of Germany | 280/801 |
|---|---|---|---|
| 4622 | 6/1988 | PCT Int'l Appl. | 280/801 |

OTHER PUBLICATIONS

Article, "Does your Child have less Safety Protection than you do?", no date.
Packaging and photos of 3R SeatBelt Adjuster ®, no date.

Primary Examiner—David M. Mitchell
Assistant Examiner—Andrew C. Pike
Attorney, Agent, or Firm—James E. Bradley

[57] ABSTRACT

An adjusting device for a vehicle seat belt assembly will adjust the inclination of the shoulder portion of the belt to accommodate children. The adjusting device is a plate which has an inboard slot, an outboard slot, and an upper slot. The shoulder and lap portions of the web overlie one another and pass through the inboard slot, across one of the sides of the plate, and through the outboard slot. The shoulder portion outboard of the plate passes upward past the other side of the plate and through the upper slot. The plate can manually slide to various positions prior to inserting the shoulder portion through the upper slot.

16 Claims, 3 Drawing Sheets

VEHICLE SEAT BELT SHOULDER STRAP ADJUSTING DEVICE

BACKGROUND OF THE INVENTION

1. Field of the Invention

This invention relates in general to seat belts for motor vehicles, and in particular to a device for adjusting the shoulder portion of a seat belt.

2. Description of the Prior Art

Most motor vehicle seat belts currently installed have an outboard portion, which is located closer to the vehicle side windows, and an inboard portion, which is located in the central portion of the vehicle. The outboard portion includes a belt or web and a latchplate which slides on the web. The outboard portion secures to a retracting mechanism, extends over a web guide mounted to a vehicle frame post and then back to an anchor. The inboard portion comprises a web with a buckle on the end, the web being anchored to the floor of the vehicle. The latchplate latches into the buckle.

When the occupant grasps the latch plate and draws it over and snaps it into the buckle, the resulting configuration will define a lap portion that extends across the lap of the user, and a shoulder portion that extends diagonally upward to the web guide.

While this arrangement works successfully for adults, the shoulder portion will be too high for small children. The angle of inclination of the shoulder portion is determined by the position of the web guide. In many vehicles, the web guide is fixed in place and set for adults. Other vehicles allow some vertical adjustment of the web guide, but not much. In many cases, the belt will pass in front of the child's face or neck. This is not a good position for protecting the child. Moreover, the child may place the belt shoulder portion behind him, eliminating protection other than the lap portion of the belt.

One device marketed comprises a sleeve that snaps over part of the lap and shoulder portions. The sleeve will reposition the point at which the shoulder portion extends from the lap portion. This repositioning changes the angle of the shoulder portion so as to pass across the shoulder of a child. However, the sleeve is not adjustable for different sizes of children. Also, once installed, an adult sitting in that place would have to remove the sleeve in order to use the seat belt properly.

Another device marketed as a seat belt adjuster comprises a two-piece plastic clip which clips over the lap portion. The clip has a tongue or lug on the front side which extends downward, defining a slot. The user places the shoulder portion in the slot under the tongue, changing the inclination of the shoulder portion. The tongue will not lock the clip in place. Also, the clip would appear to break in the event of a moderate collision.

SUMMARY OF THE INVENTION

In this invention, an adjusting device is provided to position the shoulder portion for children. The adjusting device is a plate that clips between the lap and shoulder portions of the web. The plate has a loop defined by an inboard slot and an outboard slot. The outboard slot inclines relative to the inboard slot. The shoulder and lap portions of the web are placed in overlying arrangement and passed through the inboard and outboard slots. At that point, the plate can be manually moved along the lap and shoulder portions of the belt to select the position at which the shoulder portion intersects the lap portion.

A locking means locks the plate in the selected position, the locking means comprising an upper slot that is perpendicular to the inboard slot. Once positioned, twisting and inserting the shoulder portion through the upper slot secures the plate in position. The upper slot has an opening to allow the shoulder portion to be inserted into the upper slot.

Also, preferably the inboard and outboard slots have openings so as to allow the plate to be placed on the web without removing one end from the anchor to the frame. By removing the shoulder portion from the upper slot, the plate can be moved over into contact with the latch plate if an adult uses the seat belt. This position allows the seat belt to fully retract when not in use.

DETAILED DESCRIPTION OF THE INVENTION

Figure 1:
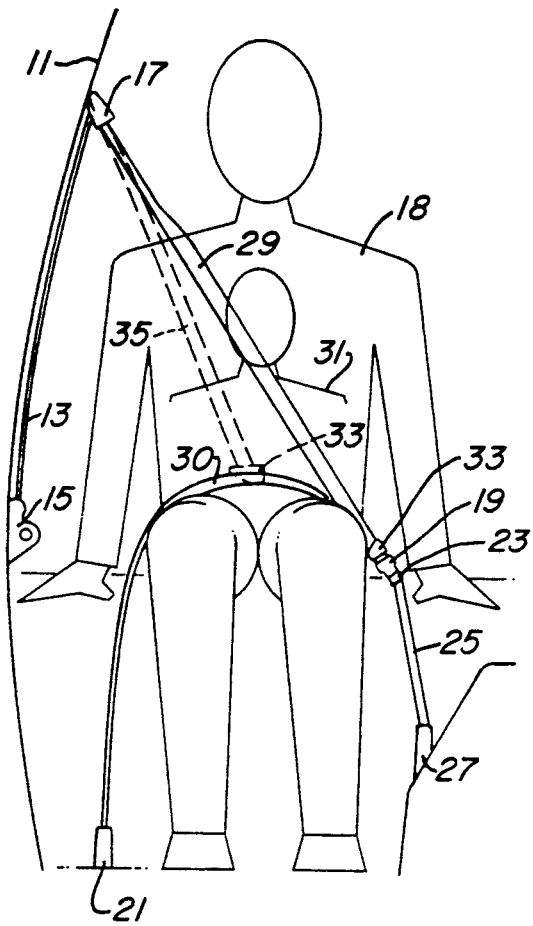
FIG. 1 is a schematic view illustrating a vehicle safety belt having an adjusting plate constructed in accordance with this invention.

Referring to FIG. 1, vehicle 11 has a seat belt assembly which has an outboard portion located next to the side windows of the vehicle. The outboard portion includes a flexible cloth belt or web 13. Web 13 is a single continuous strip, having one end secured to a conventional retracting mechanism 15. Web 13 extends upward through a web guide 17. Web guide 17 secures to a portion of the frame of the vehicle, normally a pillar, and normally at a height at least equal to the shoulder height of an average adult 18. In some cases, web guide 17 may be adjustable a few inches vertically, or it may be fixed in place.

The web 13 extends through the web guide 17 and down through a latchplate 19. Latchplate 19 is a conventional plate that will slide freely on web 13. Web 13 extends from latchplate 19 down to an anchor 21 that anchors an end of web 13 to the floor of the vehicle 11. Latchplate 19 will latch into a buckle 23, which is part of an inboard portion of the seat belt. Buckle 23 is secured to a web 25. The lower end of web 25 secures to an anchor 27 which in turn is secured to the floor of vehicle 11.

When the occupant draws the latchplate 19 over and snaps it into buckle 23, web 13 will be divided into two portions. The portion from latchplate 19 to web guide 17 will be referred to as the shoulder portion 29. The portion extending from latchplate 19 to anchor 21 will be referred to as the lap portion 30. The shoulder portion 29 extends across the outboard shoulder of adult 18 at an angle of about 60 degrees relative to vertical. Lap portion extends over the lap of adult 18.

If a child 31 occupies the seat, the shoulder portion 29 may be too high. The angle of inclination would remain approximately the same because the web guide 17 remains at approximately the same height above the floor of vehicle 11. Depending upon the height of the child, the shoulder portion 29 may locate in front of the face or neck of the child.

In this invention, to prevent that occurrence, an adjusting plate 33 is employed. Adjusting plate 33 can change the effective length and the inclination of the shoulder portion 29. It will change the point from where the shoulder portion 29 extends upward from the lap portion 30. In FIG. 1, the adjusting plate 33 has been repositioned to be approximately the center of the lap of child 31, as indicated by dotted lines 35. This makes the angle of inclination of shoulder portion 29 more vertical. The shoulder portion 29 will now extend across the shoulder of the child, rather than in front of the face or the neck.

Figure 2:
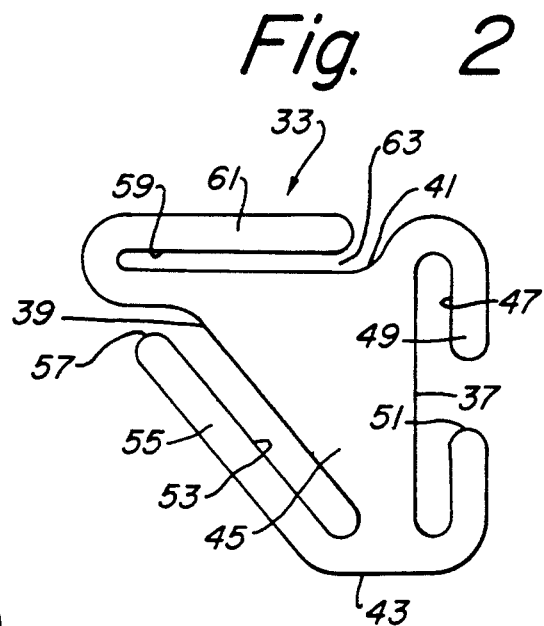
FIG. 2 is a front view of the adjusting plate of FIG. 1.
Figure 7:
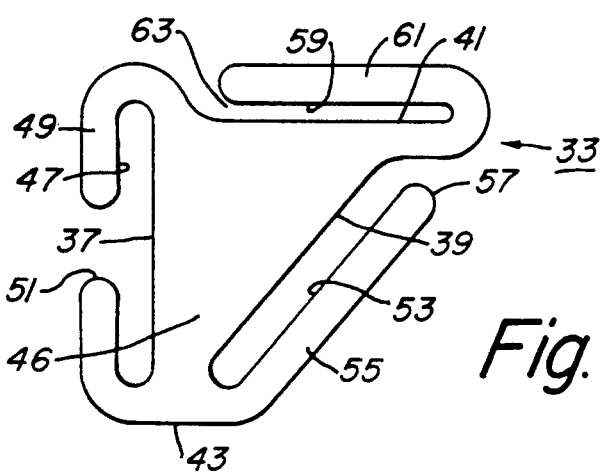
FIG. 7 is a back view of the adjusting plate of FIG. 1.

The adjusting plate 33 is shown in larger scale in FIGS. 2-6. Adjusting plate 33 is a flat, thin plate, preferably of metal, and lying in a single plane. Referring particularly to FIG. 2, the adjusting plate 33 has an inboard edge 37 that is adapted to be located inboard in vehicle 11. Plate 33 has an outboard edge 39 on the opposite edge, which is at an angle of 35-55 degrees, preferably 45 degrees relative to the inboard edge 37. Adjusting plate 33 has an upper edge 41 and a lower edge 43, each of which is perpendicular to inboard edge 37. Adjusting plate 33 has a front side 45 and a back side 46 (FIG. 7).

An inboard slot 47 is formed on the inboard edge 37. Inboard slot 47 is formed by a pair of inboard lugs 49. One lug 49 is integrally joined to adjusting plate 33 at upper edge 41. It extends downward in a general U shape, parallel to inboard edge 37 and having a free end that is slightly less than half the distance from the upper edge 41 to the lower edge 43. Similarly, the lower inboard lug 49 is integrally joined to the lower edge 43, makes a general curved U and extends upward parallel to inboard edge 37 to a free end. The free end is located less than half the distance from the lower edge 43 to the upper edge 41. The free ends are spaced apart from each other, defining an opening 51. The shape of lugs 49 define the inboard slot 47, resulting in an elongated shape having a length approximately the width of web 13. Inboard slot 47 extends perpendicular to the web lap portion 30.

An outboard slot 53 locates at outboard edge 39. The inboard slot 47 and outboard slot 53 define a loop for receiving an overlying portion of the shoulder portion 29 and lap portion 30. Outboard slot 53 is also elongated and has a length approximately the width of web 13. Outboard slot 53 is at an inclination in the range from 35 to 55 degrees, and preferably about 45 degrees, relative to inboard slot 47. The lower end of outboard slot 53 is located further inward than the upper end of outboard slot 53. Outboard slot 53 is formed by a single outboard lug 55. Outboard lug 55 integrally joins to the lower edge 43 of adjusting plate 33. Outboard lug 55 extends upward and outward, terminating in a free end. The free end results in an opening 57 to outboard slot 53.

An upper slot 59 locates at upper edge 41. Upper slot 59 is perpendicular to inboard slot 47. Upper slot 59 is elongated and has a length substantially the width of web 13. The width of upper slot 59, which is the distance from the upper edge 41 to upper lug 61, is about one-half the widths of the inboard and outboard slots 47, 53. The reason is that the upper slot 59 receives only single thickness of web 13, which is shoulder portion 29, while the inboard slot 47 and outboard slot 53 receive a double thickness which comprises overlying shoulder portion 29 and lap portion 30. Upper slot 59 is formed by a single upper lug 61. Upper lug 61 joins upper edge 41 at the outboard edge 39. Upper lug 61 extends inward perpendicular to inboard lugs 49 and at an angle of 45 degrees relative to outboard lug 55. Upper lug 61 terminates in a free end that defines an opening 63 for upper slot 59.

Figure 3:
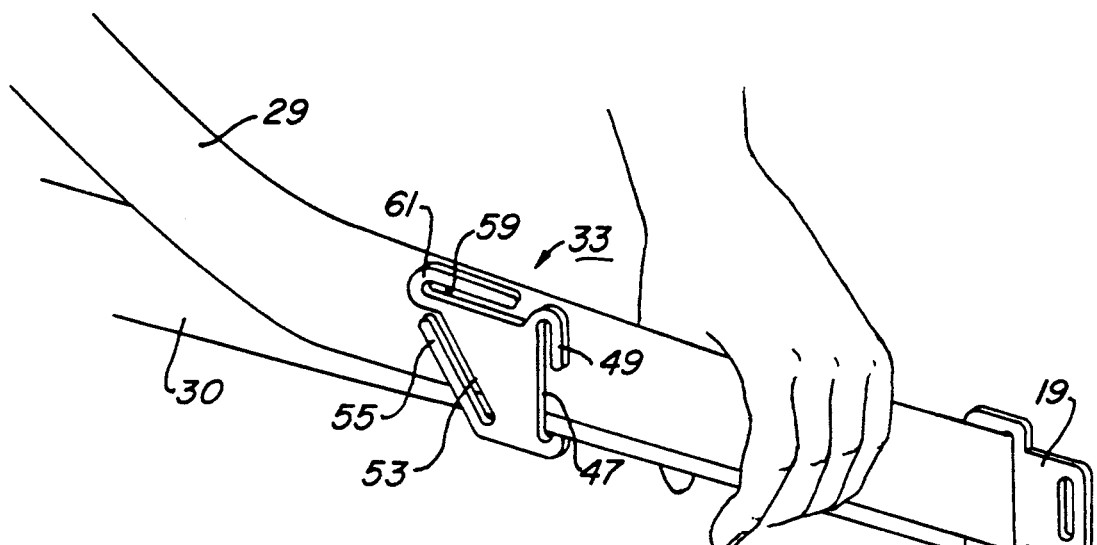
FIG. 3 is a perspective view of the adjusting plate of FIG. 2, showing a first step in the installation of the adjusting plate on the seat belt.

To install adjusting plate 33, in the preferred embodiment, there is no need to remove either end of web 13 from anchor 21 or retracting device 15. As illustrated in FIG. 3, the user first will grasp web 13 and pull latchplate 19 over. The user will place a few inches of the shoulder portion 29 on the lap portion 30. The user then inserts the overlying shoulder and lap portions 29, 30 through opening 51 into inboard slot 47. In FIG. 3, the lower edge of the shoulder and lap portions 29, 30 have been inserted into the lower portion of slot 47. The user squeezes down on the shoulder and lap portions 29, 30, then pushes the upper edge of the shoulder and lap portions 29, 30 into the upper portion of inboard slot 47.

Figure 4:
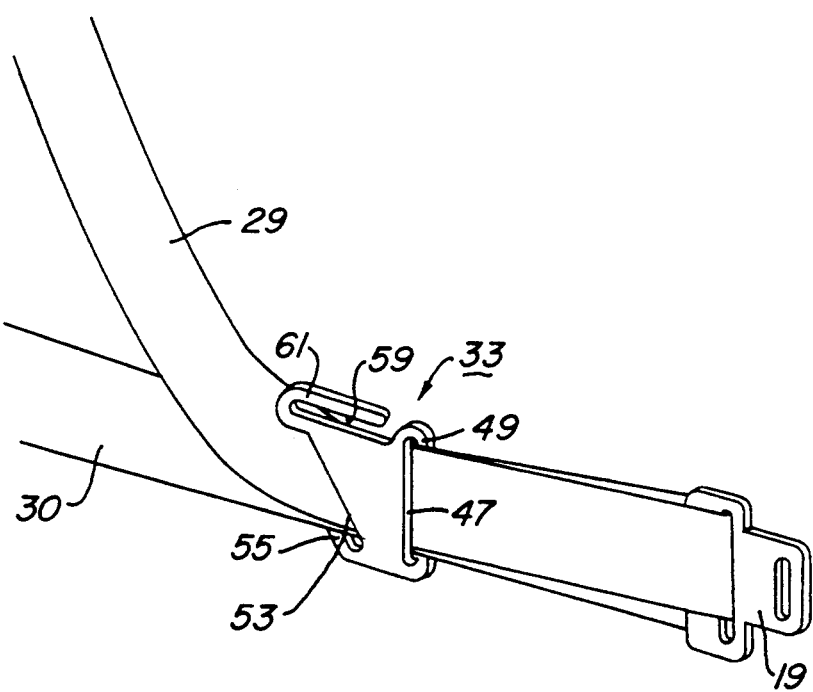
FIG. 4 is a perspective view of the adjusting plate of FIG. 2, illustrating a second step in the process of securing the adjusting device to the seat belt.

The user then grasps shoulder and lap portions 29, 30 outboard of adjusting plate 33. The user places the overlapped shoulder and lap portions 29, 30 on the back side 46 (FIG. 7) of adjusting plate 33 and inserts these portions into the outboard slot 53. The user does this by inserting them through opening 57, as shown in FIG. 4. The user will then slide the plate 33 to a selected position wherein the shoulder portion 29 will pass over the user's shoulder at the proper point.

Figure 5:
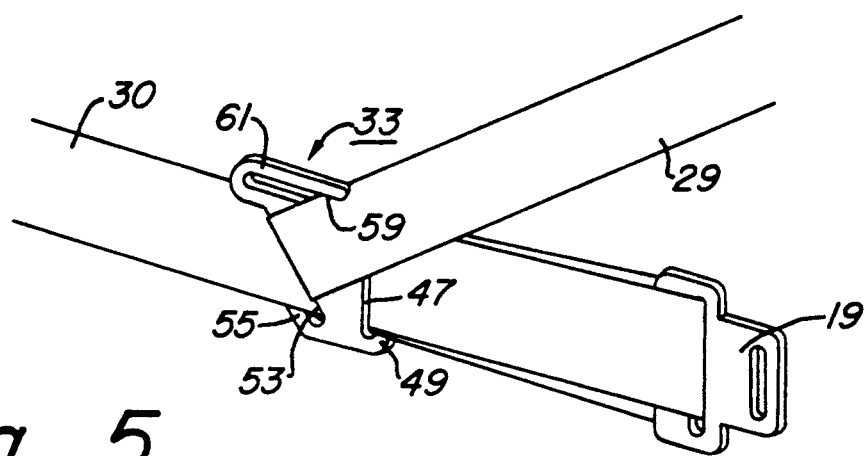
FIG. 5 is a perspective view of the adjusting plate of FIG. 2, illustrating a third step in the process of installing an adjusting plate on the seat belt.
Figure 6:
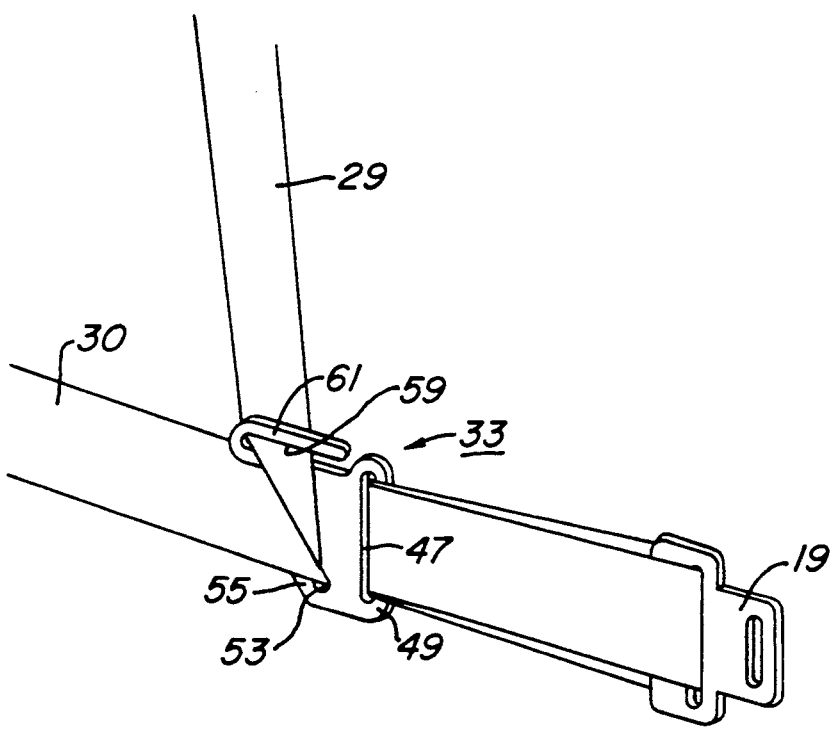
FIG. 6 is a perspective view of the adjusting plate of FIG. 2, illustrating a fourth step in the process of installing the adjusting plate on the seat belt.

Then, referring to FIG. 5, the user will grasp the shoulder portion 29 outboard of adjusting plate 33, twist it 180 degrees, and pull it in an inboard direction. The user then inserts the shoulder portion 29 only through the opening 63 and into the upper slot 59. This results in the position shown in FIG. 6, with the shoulder portion 29 extending over the front side 45 of adjusting plate 33 and rearward of the upper lug 61. The shoulder portion 29 at upper slot 59 will be approximately perpendicular to the lap portion 30 at inboard slot 47. The friction caused by the twist and change in direction locks the plate 33 to the shoulder and lap portions 29, 30, preventing the plate 33 from sliding.

As illustrated in FIG. 1 by the dotted lines 35, the positioning of plate 33 can cause the shoulder portion 29 to extend across the shoulder of the child 31, rather than across the neck or face. If an adult 18 is to sit in the seat after it has been adjusted for a child, the adult removes the shoulder portion 29 from the upper slot 59, then slides the adjusting plate 33 inboard until it contacts the latchplate 19. The inclination of shoulder portion 29 will now be at a conventional angle. Adjusting plate 33 is shown in contact with latchplate 19 by the solid lines in FIG. 1, while the dotted lines showing adjusting 33 moved to a position for a child 31. When plate 33 is in contact with latchplate 19, the retracting mechanism 15 will be capable of fully retracting the shoulder portion 29 and lap portion 30 when latchplate 19 is released from buckle 23.

The invention has significant advantages. The plate will easily reposition the shoulder portion of a seat belt to accommodate a child. The plate is easily installable. The plate is of single piece construction and inexpensive to manufacture. The plate can be readily adjusted for adult use.

While the invention has been shown in only one of its forms, it should be apparent to those skilled in the art that it is not so limited, but is susceptible to various changes without departing from the scope of the invention. For example, original equipment manufacturers of motor vehicles need not provide openings for the inboard and outboard slots as the adjusting plate can be installed during initial installation of the seat belt.

We claim:

1. In a vehicle seat belt assembly having an inboard portion containing a buckle, an outboard portion including a web and a latchplate which is adapted to be drawn across an occupant and latched into the buckle, defining a shoulder portion and a lap portion, the improvement comprising an adjusting device to position the shoulder portion for children, the adjusting device comprising:

a plate having a loop, an outboard edge which inclines relative to the loop, and an upper slot that is substantially perpendicular to the loop;

the shoulder and lap portions overlying each other and passing through the loop, the shoulder portion twisting back over the outboard edge and extending upward; and the upper slot having an opening through which the shoulder portion may be inserted to lock the plate against movement along the overlying shoulder and lap portions, the opening allowing the shoulder portion to be removed to allow the plate to slide along the overlying shoulder and lap portions to select a desired position.

2. In a vehicle seat belt assembly having an inboard portion containing a buckle, an outboard portion including a web and a latchplate which is adapted to be drawn across an occupant and latched into the buckle, defining a shoulder portion and a lap portion, the improvement comprising an adjusting device to position the shoulder portion for children, the adjusting device comprising:

a plate having an inboard edge, an outboard edge, a lower edge, an upper edge, a front side, and a back side;

an elongated inboard slot on the inboard edge of the plate;

an elongated outboard slot on the outboard edge of the plate;

the shoulder and lap portions of the web overlying one another and passing through the inboard slot, across one of the sides and through the outboard slot; and locking means for selectively preventing the plate from sliding relative to the shoulder and lap portions, the locking means being releasable for manually sliding the plate relative to the shoulder and lap portions for selectively varying a point at which the shoulder portion extends upward from the lap portion; and wherein the locking means comprises:

an elongated upper slot located on the upper edge of the plate and extending substantially perpendicular to the inboard slot, the shoulder portion extending upward and twisting from the outboard slot and passing through the upper slot; and the upper slot having an opening into which the shoulder portion may be inserted and removed to selectively lock and release the plate.

3. In a vehicle seat belt assembly having an inboard portion containing a buckle, an outboard portion including a web and a latchplate which is adapted to be drawn across an occupant and latched into the buckle, defining a shoulder portion and a lap portion, the improvement comprising an adjusting device to position the shoulder portion for children, the adjusting device comprising:

a plate having an inboard edge, an outboard edge, a lower edge, an upper edge, a front side, and a back side;

an elongated inboard slot on the inboard edge of the plate;

an elongated outboard slot on the outboard edge of the plate;

the shoulder and lap portions of the web overlying one another and passing through the inboard slot, across one of the sides and through the outboard slot; and locking means for selectively preventing the plate from sliding relative to the shoulder and lap portions, the locking means being releasable for manually sliding the plate relative to the shoulder and lap portions for selectively varying a point at which the shoulder portion extends upward from the lap portion; and wherein one of the inboard and outboard slots is defined by a pair of lugs, one of the lugs joined to the upper edge of the plate at and extending toward the lower edge of the plate, another of the lugs joined to the lower edge of the plate and extending toward the upper edge of the plate, each of the lugs having a free end which is spaced apart from the free end of the other lug, defining an opening to allow the lap and shoulder portions to be inserted into said one of the inboard and outboard slots without removal of an end of a web from attachment to the vehicle.

4. The improvement according to claim 3 wherein said one of the inboard and outboard slots is the inboard slot.

5. In a vehicle seat belt assembly having an inboard portion containing a buckle, an outboard portion including a web and a latchplate which is adapted to be drawn across an occupant and latched into the buckle, defining a shoulder portion and a lap portion, the improvement comprising an adjusting device to position the shoulder portion for children, the adjusting device comprising:

a plate having an inboard edge, an outboard edge, a lower edge, an upper edge, a front side, and a back side;

an elongated inboard slot on the inboard edge of the plate;

an elongated outboard slot on the outboard edge of the plate;

the shoulder and lap portions of the web overlying one another and passing thorough the inboard slot, across one of the sides and through the outboard slot; and locking means for selectively preventing the plate from sliding relative to the shoulder and lap portions, the locking means being releasable for manually sliding the plate relative to the shoulder and lap portions for selectively varying a point at which the shoulder portion extends upward from the lap portion; and wherein one of the inboard and outboard slots is defined by a pair of lugs, one of the lugs joined to the upper edge of the plate at and extending toward the lower edge of the plate, another of the lugs joined to the lower edge of the plate and extending toward the upper edge of the plate, each of the lugs having a free end which is spaced apart from the free end of the other lug, defining an opening; and wherein another of the inboard and outboard slots is defined by a single lug, having one end joined to one of the upper and lower edges of the plate at and extending toward another of the upper and lower edges of the plate, the single lug having a free end which is spaced apart from the plate, defining an opening, the openings allowing the lap and shoulder portions to be inserted into the slots without removal of an end of the web from attachment to a vehicle.

6. The improvement according to claim 5 wherein said one of the inboard and outboard slots is the inboard slot and said other of the inboard and outboard slots is the outboard slot.

7. In a vehicle seat belt assembly having an inboard portion containing a buckle, an outboard portion including a web and a latchplate which is adapted to be drawn across an occupant and latched into the buckle, defining a shoulder portion and a lap portion, the improvement comprising an adjusting device to position the shoulder portion for children, the adjusting device comprising:

a plate having an inboard edge, an outboard edge, a lower edge, an upper edge, a front side, and a back side;

an elongated inboard slot on the inboard edge of the plate;

an elongated outboard slot on the outboard edge of the plate, the outboard slot inclining relative to the inboard slot, with a lower end of the outboard slot being located farther [inboard] inward than an upper end of the outboard slot;

an elongated upper slot on the upper edge of the plate;

the shoulder and lap portions of the web overlying one another and passing through the inboard slot, across one of the sides and through the outboard slot; and the upper slot having an opening, so that the shoulder portion may be twisted and passed from the outboard slot across another of the sides and through the upper slot to prevent the plate from sliding relative to the shoulder and lap portions, the opening in the upper slot allowing the shoulder portion to be removed from the upper slot to allow a user to manually slide the plate relative to the shoulder and lap portions for selectively varying a point at which the shoulder portion extends upward from the lap portion.

8. The improvement according to claim 7 wherein the upper slot is substantially perpendicular to the inboard slot.

9. The improvement according to claim 7 wherein the inboard and outboard slots each has an opening to allow the lap and shoulder portions to be inserted into the inboard and outboard slots without removal of an end of the web from attachment to a vehicle.

10. The improvement according to claim 7 wherein the overlying shoulder and lap portions between the inboard and outboard slots pass across the back side of the plate, and the shoulder portion between the outboard slot and the upper slot passes across the front side of the plate.

11. The improvement according to claim 7 wherein one of the inboard and outboard slots is defined by a pair of lugs, one of the lugs joined to the upper edge of the plate at and extending toward the lower edge of the plate, another of the lugs joined to the lower edge of the plate and extending toward the upper edge of the plate, each of the lugs having a free end which is spaced apart from the free end of the other lug, defining an opening to allow the lap and shoulder portions to be inserted into said one of the inboard and outboard slots without removal of an end of the web from attachment to a vehicle.

12. The improvement according to claim 11 wherein said one of the inboard and outboard slots is the inboard slot.

13. The improvement according to claim 7 wherein one of the inboard and outboard slots is defined by a single lug, having one end joined to one of the upper and lower edges of the plate at and extending toward another of the upper and lower edges of the plate, the having a free end which is spaced apart from the plate, defining an opening to allow the lap and shoulder portions to be inserted into said one of the slots without removal of an end of the web from attachment to a vehicle.

14. The improvement according to claim 13 wherein said one of the inboard and outboard slots is the outboard slot.

15. The improvement according to claim 7 wherein the upper slot is defined by a single lug joined to the outboard edge and extending toward the inboard edge.

16. A method for adjusting a position of a shoulder portion of a vehicle seat belt assembly for children, the seat belt assembly having an inboard portion containing a buckle, an outboard portion including a web and a latchplate which is adapted to be drawn across an occupant and latched into the buckle, defining the shoulder portion and a lap portion, the method comprising:

providing a plate with a loop, an outboard edge, and an upper slot;

overlying the shoulder and lap portions of the web and passing the shoulder and lap portions through the loop;

manually sliding the plate to a position selecting a point at which the shoulder portion extends upward from the lap portion; and then twisting the shoulder portion around the outboard edge and passing the shoulder portion upward through the upper slot.

* * * * *